(12) United States Patent
Cornwall (10) Patent No.: US 6,679,015 B1
(45) Date of Patent: Jan. 20, 2004

(54) HUB SEAL FIRESTOP DEVICE

(76) Inventor: Kenneth R. Cornwall, 1020 Vintage Club Dr., Duluth, GA (US) 30097

( * ) Notice: Subject to any disclaimer, the term of this patent is extended or adjusted under 35 U.S.C. 154(b) by 68 days.

(21) Appl. No.: 10/050,297

(22) Filed: Jan. 16, 2002

(51) Int. Cl.[7] .............................................. E04C 2/52
(52) U.S. Cl. ............................................ 52/232; 52/1
(58) Field of Search ..................... 52/232, 1; 285/187, 285/404, 369, 417

(56) References Cited

U.S. PATENT DOCUMENTS

| | | | |
|---|---|---|---|
| 4,109,423 A | | 8/1978 | Perrain |
| 4,538,389 A | | 9/1985 | Heinen |
| 4,888,925 A | * | 12/1989 | Harbeke .................. 52/232 |
| 4,951,442 A | * | 8/1990 | Harbeke, Jr. ............ 52/745.2 |
| 5,299,836 A | * | 4/1994 | Woods ..................... 285/42 |
| 5,634,304 A | * | 6/1997 | Sakno ..................... 52/232 |
| 6,470,635 B2 | * | 10/2002 | Cornwall ................. 52/220.8 |

* cited by examiner

Primary Examiner—Carl D. Friedman
Assistant Examiner—Basil Katcheves
(74) Attorney, Agent, or Firm—Mary M. Moyne; Ian C. McLeod (57) ABSTRACT

A firestop device (10) and firestop assembly for use in a plumbing system (100) installed in a structure to prevent the transmission of smoke and fire through the plumbing system. The firestop device includes a housing (12) with a connector (14) and intumescent material (16) mounted in the inner passageway (12C) of the housing. The firestop device is intended to be mounted over the hub portion (50B) of a plumbing fitting (50). When the housing is heated, the heat is transferred to the intumescent material which expands. As the intumescent material expands, the material crushes the conduit (102) extending through the firestop device and completely blocks the inner passageway (10C) of the firestop device which prevents smoke and fire from moving through the firestop device.

28 Claims, 4 Drawing Sheets

HUB SEAL FIRESTOP DEVICE

CROSS-REFERENCE TO RELATED APPLICATION

Not Applicable

STATEMENT REGARDING FEDERALLY SPONSORED RESEARCH OR DEVELOPMENT

Not Applicable

BACKGROUND OF THE INVENTION (1) Field of the Invention

The present invention relates to a firestop device for use with a plumbing fitting to prevent the transmission of smoke and fire through a plumbing system of a structure. In particular, the present invention relates to a firestop device which mounts over a hub portion of a plastic plumbing fitting and which has an inner passageway having intumescent material. The intumescent material expands when heated to close the inner passageway of the firestop device to prevent smoke and fire from entering the conduit through the wall and the hub portion having the firestop device.

(2) Description of the Related Art

In the past, firestop devices for use with plumbing fittings were in the form of collars which were attached to the wall or other partition adjacent the hub portion of the plumbing fitting. However since, this form of firestop device was mounted on the wall or partition adjacent the plumbing fitting. The firestop device was installed after the partition was finished. Thus, the plumbing installer would need to come back to install the firestop device after the partition was complete. Further, since the firestop device was mounted on the partition, the conduit and/or the plumbing fitting would need to be square with the partition in order for the device to fit correctly around the plumbing fitting or conduit when fastened to the partition. The related art has shown various different devices for preventing the passage of smoke and fire through a hollow element or pipe in a structure and particularly, through a partition.

U.S. Pat. No. 4,109,423 to Perrain describes a fireproof device for mounting around a tube which extends through a wall. The device includes a case having slidable elements both constructed of a material which is non-deformable under heat. The case is filled with a material which swells under the effect of heat. In operation, when the device is heated, the material expands and slides the elements into the operative position to close off the orifice in the casing through which the tube extends. The reference also describes a flap inside the hollow element which allows for closure of the passageway when a fire breaks out. Closing of the door can occur automatically such as by being controlled by a fire sensor.

U.S. Pat. No. 4,538,389 to Heinen relates to a fire-break having a flange constructed of substantially incombustible material mounted against the outer surface of the hollow element and connected to the wall. The flange is comprised of two (2) discrete portions which are assembled around the hollow element. The flange can include at least one (1) baffle from a substantially gas-tight material, which conducts heat. The baffle extends about the hollow element between two (2) layers of fireproof compound. The fire-break reduces the increase in the temperature in the hollow element during a fire. Thus, the fire-break does not close the opening but prevents the hollow element from rising in temperature. The fire-break is intended to replace heat-expanding products which exert radial pressure on a hollow element to crush the element.

There remains a need for a firestop device which can be quickly and easily mounted over a hub portion of a plumbing fitting, which does not interfere with the connection of conduit to the plumbing fitting using the hub portion and which can be installed during installation of the remainder of the plumbing system.

SUMMARY OF THE INVENTION

A firestop device and firestop assembly for use in a plumbing system installed in a structure to prevent the transmission of smoke and fire through the plumbing system. The firestop assembly includes the firestop device and a plumbing fitting. The plumbing fitting includes hub portions which allow for connecting conduits to the plumbing fitting to form the plumbing system. The firestop device is mounted over the hub portion. The firestop device includes a housing constructed of a heat resistant material. A connector is mounted in the inner passageway of the housing. The connector has a first portion having an inner diameter which enables the housing to be mounted on the hub portion. The inner diameter is essentially equal to the outer diameter of the hub portion. The second portion of the connector has a smaller inner diameter. The inner diameter of the second portion of the connector is essentially equal to the outer diameter of the conduit. The second portion of the connector assists in centering the conduit in the hub of the plumbing fitting and also enables the firestop device to be secured to the conduit. Intumescent material is positioned in the inner passageway of the housing between the connector and the second end of the housing. The second end of the housing can be provided with a flange to further assist in holding the intumescent material in the housing. The inner diameter of the housing with the intumescent material is greater than the outer diameter of the conduit to enable the conduit to be extended through the firestop device. When the housing of the firestop device is heated such as during a fire, the heat is transferred to the intumescent material which expands. As the intumescent material expands, the material exerts pressure on the conduit extending through the firestop device. Usually, the conduit is constructed of a material which weakens or melts when exposed to heat. The pressure exerted by the expanding intumescent material is strong enough to crush or collapse the conduit. The intumescent material is then able to completely block and seal the inner passageway of the firestop device which prevents smoke and fire from entering or exiting the plumbing fitting through the hub portion and the firestop device.

The firestop assembly can be used adjacent a partition of a structure such that a hub portion with the firestop device extends through an opening in the partition. The firestop assembly is positioned such that the firestop assembly extends through the opening with the section of the housing having the intumescent material spaced on the side of the partition opposite the body of the plumbing fitting. The firestop assembly can be installed when the plumbing system is installed. Further, the plumbing fitting can be installed such that the hub portion and the conduit are angled with respect to the partition.

The present invention relates to a firestop device for mounting on a hub portion of a plumbing fitting of a plumbing system installed in a structure to prevent the transmission of smoke and fire through the plumbing fitting, which comprises: a housing constructed of a heat resistant material having a first end and a second end with an inner passageway extending between the ends wherein a shape and size of the inner passageway at the first end is configured to extend over the hub portion of the plumbing fitting; and intumescent material held in the inner passageway of the housing at the second end wherein an inner diameter of the housing with the intumescent material at the second end of the housing is configured such as to prevent the inner passageway having the intumescent material from extending over the hub portion of the plumbing fitting wherein the intumescent material when heated is configured to crush a conduit of the plumbing system which extends through the firestop device and to completely fill the inner passageway of the housing at the second end.

Further, the present invention relates to a firestop device for mounting on a hub portion of a plumbing fitting to prevent transmission of smoke and fire through the plumbing fitting, which comprises: a housing having a first end and a second end with an inner passageway having a cylindrical shape extending between the ends wherein a diameter of the inner passageway at the first end is configured to extend over the hub portion of the plumbing fitting; intumescent material held in the inner passageway of the housing adjacent the second end; and a connector having a first end and a second end with an inner passageway extending between the ends and positioned in the inner passageway of the housing spaced between the intumescent material and the first end of the housing wherein an inner diameter of the inner passageway of the connector at the first end of the connector is configured to allow the first end of the connector to extend over the hub portion of the plumbing fitting.

Still further, the present invention relates to a firestop coupling assembly for preventing the transmission of smoke and fire through a partition in a structure, including a plumbing fitting having a hub portion, the improvement which comprises: a firestop device secured on the hub portion of the plumbing fitting, the firestop device including: a housing constructed of a heat resistant material with a first end and a second end with an inner passageway having a cylindrical shape extending between the ends, a diameter of the inner passageway at the first end configured to allow the first end of the housing to extend over the hub portion; intumescent material positioned in the inner passageway at the second end; and a connector having a first end and a second end and with an inner passageway extending between the ends and positioned in the inner passageway of the housing spaced between the intumescent material and the first end of the housing wherein an inner diameter of the inner passageway of the connector at the first end of the connector is configured to allow the first end of the connector to extend over the hub portion of the plumbing fitting.

Further still, the present invention relates to a method for preventing the transmission of smoke and fire through a plumbing system in a structure, comprising the steps of: providing a plumbing fitting having at least one hub portion; providing a firestop device including a housing constructed of a heat resistant material having a first end and a second end with an inner passageway extending therebetween wherein the first end of the housing is configured to extend over the hub portion of the plumbing fitting; intumescent material positioned in the inner passageway at the second end; and a connector having a first end and a second end and with an inner passageway extending between the ends and positioned in the inner passageway of the housing spaced between the intumescent material and the first end of the housing wherein an inner diameter of the inner passageway of the connector at the first end of the connector is configured to allow the first end of the connector to extend over the hub portion of the plumbing fitting; mounting the firestop device over the hub portion of the plumbing fitting; installing the plumbing fitting in the plumbing system in the structure; and heating the intumescent material to a first predetermined temperature such that the intumescent material expands to fill the inner passageway at the second end of the housing which prevents smoke and fire from entering the plumbing fitting through the hub portion having the firestop device and from being transmitted through the plumbing system in the structure.

Finally, the present invention relates to a plumbing system for preventing transmission of smoke and fire through a partition in a structure, the system including a plumbing fitting having a hub portion and a conduit for mounting in the plumbing fitting, the improvement which comprises: a firestop device secured on the hub portion of the plumbing fitting, the firestop device including: a housing constructed of a heat resistant material with a first end and a second end with an inner passageway wherein a diameter of the inner passageway at the first end is such as to extend over the hub portion; and intumescent material held in the inner passageway at the second end of the housing and a connector having a first end and a second end and with an inner passageway extending between the ends and positioned in the inner passageway of the housing spaced between the intumescent material and the first end of the housing wherein an inner diameter of the inner passageway of the connector at the first end of the connector is configured to allow the first end of the connector to extend over the hub portion of the plumbing fitting.

The substance and advantages of the present invention will become increasingly apparent by reference to the following drawings and the description

DESCRIPTION OF THE PREFERRED EMBODIMENTS

Figure 1:
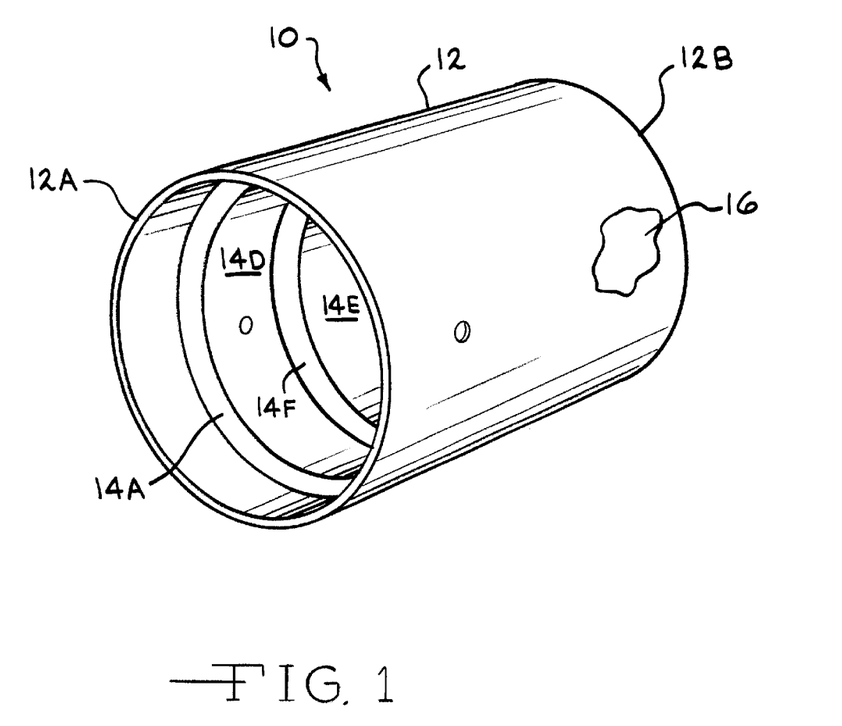
FIG. 1 is a perspective view of the firestop device 10.
Figure 2:
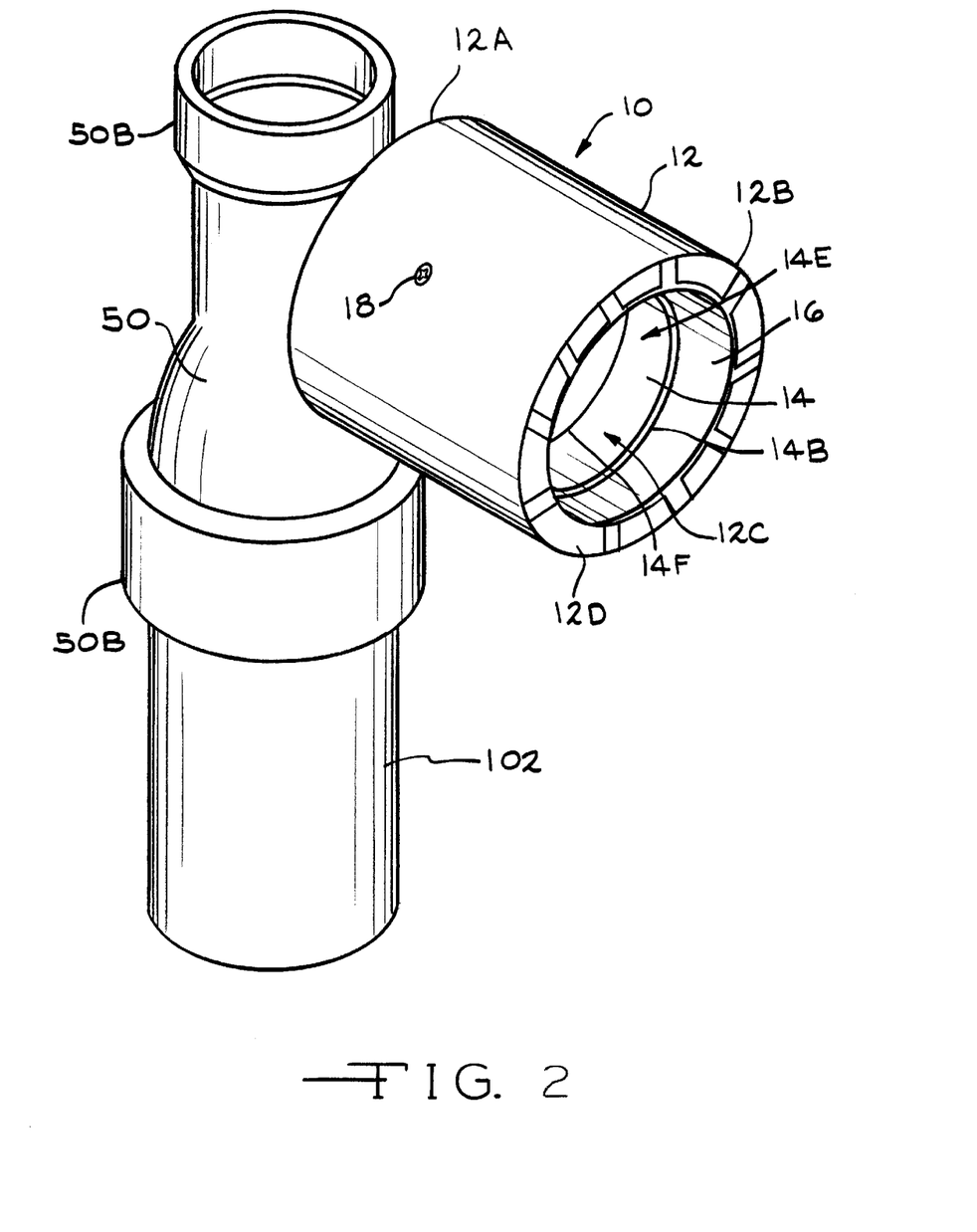
FIG. 2 is a perspective view of a firestop assembly showing the plumbing fitting 50 having the firestop device 10 mounted on one of the hub portions 50B.

The firestop device 10 of the present invention is intended to be secured on the hub portion 50B of a plumbing fitting 50 to prevent the transmission of smoke and fire through the plumbing fitting 50 (FIG. 1). The firestop device 10 includes a housing 12 having a first end 12A and a second end 12B with an inner passageway 12C extending therebetween. In one (1) embodiment, the housing 12 has a cylindrical shape. The inner passageway 12C has the same shape as the outer surface of the hub portion 50B. In one (1) embodiment, the inner passageway 12C has a cylindrical shape. The housing 12 is constructed of a heat resistant, non-deformable material. Thus, the housing 12 does not melt or deform under normal heating conditions found in a building fire. The housing 12 can also be constructed of a heat conductive material. In one (1) embodiment, the housing 12 is constructed of metal. The second end 12B of the housing 12 extends around the edge to create a rim or flange 12D around the second end 12B. The flange 12D can be formed by a series of separate tabs which are folded over after the intumescent material 16 is positioned in the inner passageway 12C (FIG. 2).

Figure 3:
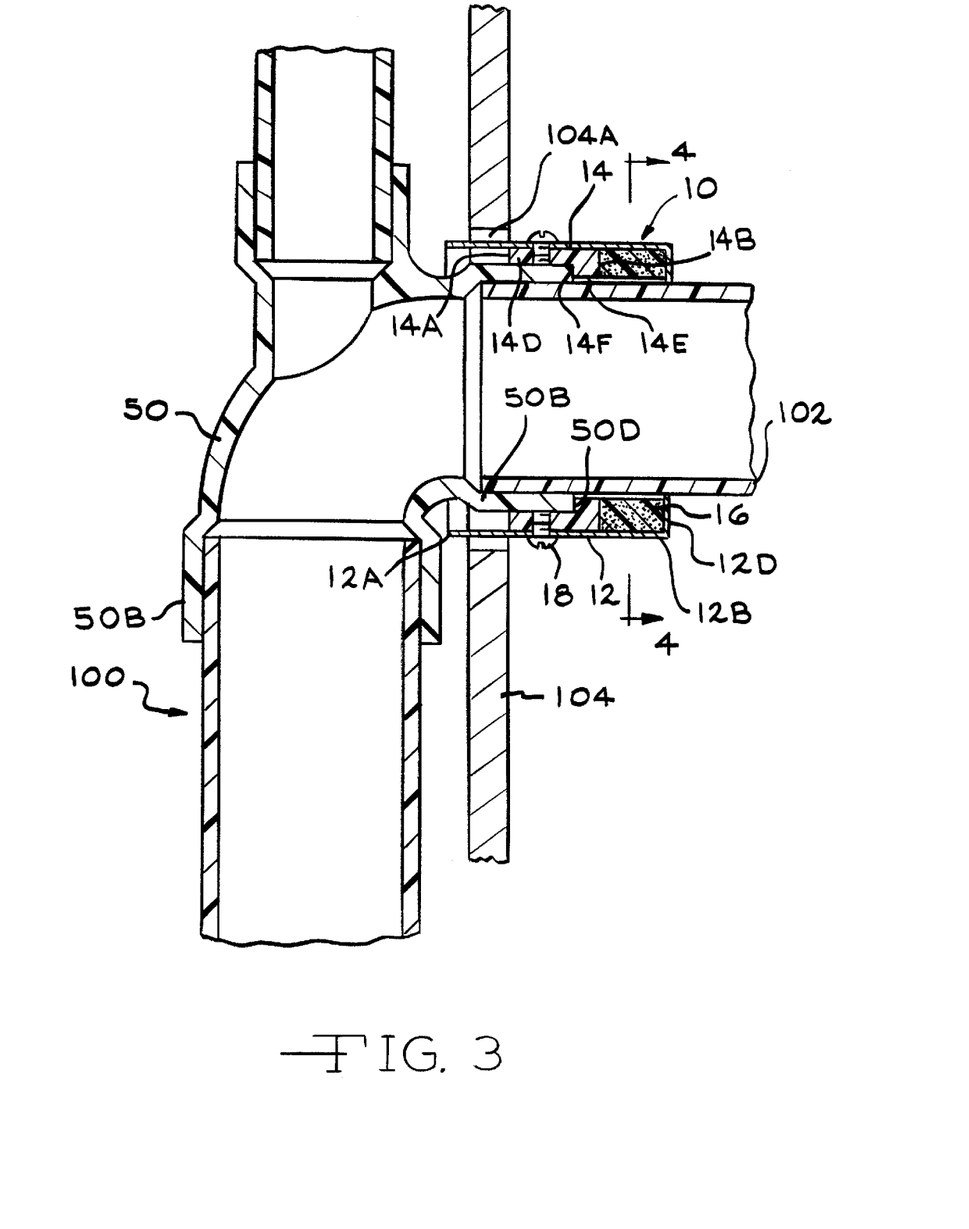
FIG. 3 is a cross-sectional view of the plumbing fitting 50 with the firestop device 10 showing the intumescent material 16 in the inner passageway 12C of the housing 12.

A connector 14 is positioned in the inner passageway 12C of the housing 12 spaced between the first and second ends 12A and 12B of the housing 12 and extends around the entire circumference of the inner passageway 12C of the housing 12. The connector 14 is spaced apart from the second end 12B of the housing 12. The connector 14 can be adjacent to or spaced apart from the first end 12A of the housing 12. The connector 14 has a first end 14A and a second end 14B with an inner passageway 14C extending therebetween. The inner passageway 14C has a first portion 14D adjacent the first end 14A with a first inner diameter and a second portion 14E adjacent the second end 14B with a second inner diameter (FIGS. 1 and 3). The first inner diameter is larger than the second inner diameter. A shoulder 14F is formed in the inner passageway 14C between the first and second portions 14D and 14E of the inner passageway 14C. The first inner diameter is preferably slightly greater than the outer diameter of the hub portion 50B such that the first portion 14D of the inner passageway 14C of the connector 14 can extend over the end 50D of the hub portion 50B opposite the body 50A of the plumbing fitting 50. The inner diameter of the second portion 14E of the inner passageway 14C of the connector 14 is preferably essentially equal to the inner diameter of the hub portion 50B or essentially equal to the outer diameter of the conduit or pipe 102 to be connected to the plumbing fitting 50. Thus, the thickness of the shoulder 14F formed between the first and second portions 14D and 14E is essentially equal to the thickness of the hub portion 50B at the end 50D. In one (1) embodiment, the connector 14 extends along only a portion of the inner passageway 12C of the housing 12. The connector 14 can be constructed of any material. In one (1) embodiment, the connector 14 is constructed of PVC. The connector 14 can be secured to the housing 12 by any means such as by an adhesive.

Figure 4:
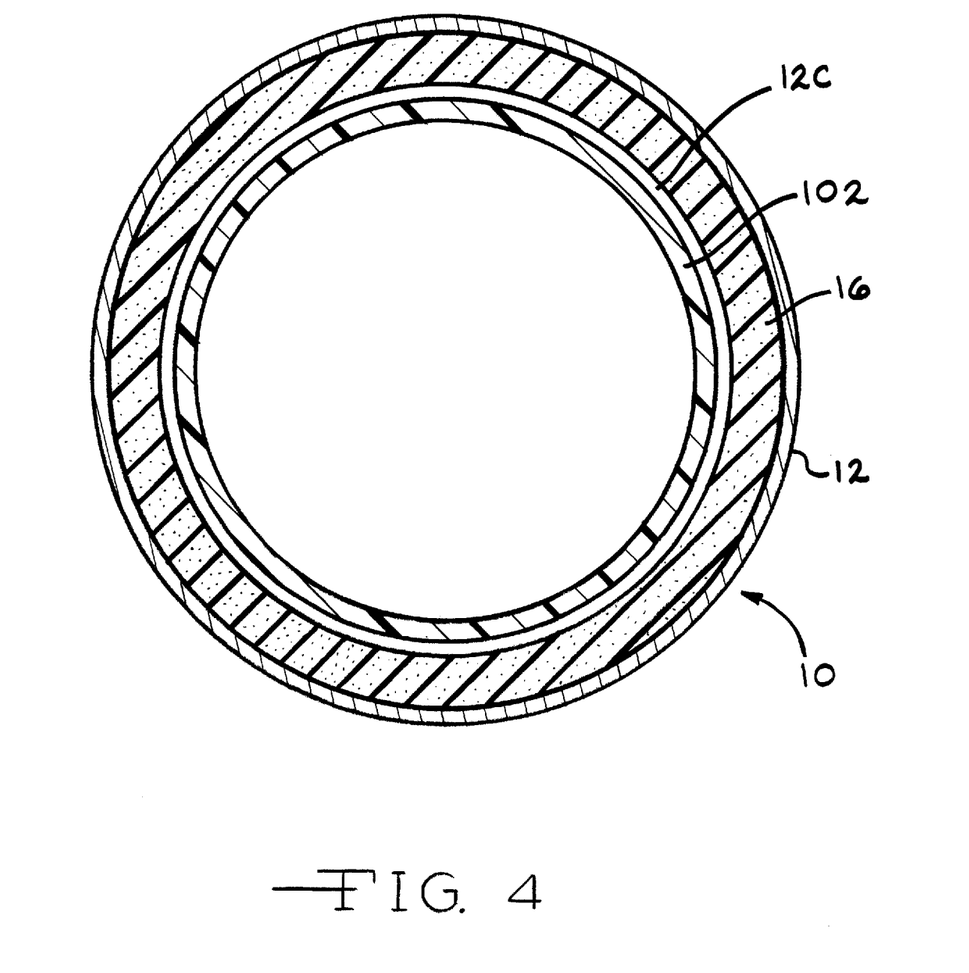
FIG. 4 is a cross-sectional view along the line 3—3 of FIG. 2 showing the housing 12, the intumescent material 16 and the inner conduit 102.

Intumescent material 16 is positioned in the inner passageway 12C of the housing 12 adjacent the second end 12B of the housing 12. The intumescent material 16 is spaced between the second end 12B of the housing 12 and the connector 14. In one (1) embodiment, the intumescent material 16 extends the entire length of the inner passageway 12C from the second end 12B of the housing 12 to the second end 14B of the connector 14. The intumescent material 16 may contact the connector 14. In one (1) embodiment, the length of the connector 14 and the length of the intumescent material 16 together essentially equal the entire length of the inner passageway 12C of the housing 12. The intumescent material 16 extends the entire circumference of the inner passageway 12C. In one (1) embodiment, the inner diameter of the intumescent material 16 is essentially equal to the diameter of the second portion 14E of the inner passageway 14C of the connector 14. The inner diameter of the intumescent material 16 is less than the outer diameter of the conduit 102 (FIG. 4). The intumescent material 16 may be secured to the inner passageway 12C of the housing 12. An adhesive (not shown) may be used to secure the intumescent material 16 to the housing 12. The intumescent material 16 may also be held in place in the inner passageway 12C of the housing 12 by the connector 14 and the flange 12D of the housing 12. The length of the tabs forming the flange 12D at the second end 12B of the housing 12 is preferably slightly greater than the thickness of the intumescent material 16. In one (1) embodiment, the intumescent material 16 is an intumescent single thickness wrap strip.

The firestop device 10 is intended to be mounted on a plumbing fitting 50 which is part of a plumbing system 100 installed in a structure. The plumbing fitting 50 has a body 50A with at least one (1) hub portion 50B extending therefrom. The hub portions 50B allow for connecting conduits or pipes 102 to the plumbing fitting 50. The hub portion 50B has an enlarged outer diameter with an inner passageway 50C which allows for inserting a conduit 102. In the preferred embodiment, the plumbing fitting 50 and the conduit 102 are constructed of plastic. The firestop device 10 mounts over the hub portion 50B of the plumbing fitting 50 (FIG. 1). A plumbing fitting 50 may have several hub portions 50B and may have a firestop device 10 mounted on each hub portion 50B. The firestop device 10 is configured to extend over the outer surface of the hub portion 50B. The firestop device 10 is positioned on the hub portion 50B such that the longitudinal axis of the inner passageway 14C of the connector 14 is co-axial with the longitudinal axis of the inner passageway 50C of the hub portion 50B. In one (1) embodiment, the firestop device 10 is moved over the hub portion 50B until the end 50D of the hub portion 50B opposite the body 50A contacts the shoulder 14F of the connector 14 in the inner passageway 12C of the housing 12 (FIG. 3). In an alternative embodiment, the first end 12A of the housing 12 is extended over the outer surface of a hub portion 50B of the plumbing fitting 50 until the first end 12A of the housing 12 contacts the body 50A of the plumbing fitting 50. In one (1) embodiment, the first end 12A of the housing 12 extends beyond the hub portion 50B and covers a portion of the body 50A of the plumbing fitting 50. In one (1) embodiment, the first portion 14D of the inner passageway 14C of the connector 14 extends the entire length of the hub portion 50B covered by the firestop device 10. The device 10 can be secured to the hub portion 50B by any well known method. Fasteners 18 can be extended through the housing 12 and through the connector 14 and into the hub portion 50B of the plumbing fitting 50 to secure the firestop device 10 on the plumbing fitting 50 (FIG. 2). The fasteners 18 do not extend into the inner passageway 50C of the hub portion 50B. In another embodiment, the connector 14 is adhesively welded to the outer surface of the hub portion 50B to secure the firestop device 10 onto the hub portion 50B. The firestop device 10 could also be friction fit over the hub portion 50B of the plumbing fitting 50.

The portion of the housing 12 having the intumescent material 16 extends beyond the end 50D of the hub portion 50B opposite the body 50A of the plumbing fitting 50. The length and thickness of the intumescent material 16 depends on the inner diameter of the hub portion 50B or the outer diameter of the conduit 102 and the expansion ratio of the intumescent material 16. In one (1) embodiment, the diameter of the inner passageway 12C of the housing 12 with the intumescent material 16 is essentially equal to the inner diameter of the hub portion 50B or the outer diameter of the conduit 102. Thus, when the conduit 102 is extended into the inner passageway 12C of the housing 12 and into the hub portion 50B, the intumescent material 16 is adjacent the outer surface of the conduit 102. The intumescent material 16 may be in contact with the outer surface of the conduit 102.

To use the device 10 in a plumbing system 100, the firestop device 10 is mounted on one (1) hub portion 50B of the plumbing fitting 50 to form a firestop assembly. The plumbing fitting 50 may have several hub portions 50B with one (1) or more of the hub portions 50B having firestop devices 10. The firestop device 10 could be mounted on all the hub portions 50B of the plumbing fitting 50 and this would prevent fire or smoke from entering or exiting the plumbing fitting 50 from any hub portion 50B. However, it is understood that to prevent transmission through the plumbing fitting 50, it is sufficient to have firestop devices 10 on all but one (1) hub portion 50B. In one (1) embodiment, the firestop assembly is used adjacent a partition 104. The partition 104 can be a floor, wall or ceiling. The partition 104 can be constructed of gypsum board, steel or wood or any other material well known for building partitions 104. The firestop assembly can be mounted in the partition before the partition is complete for example, before the gypsum board is installed. The firestop assembly is positioned such that one (1) of the hub portions 50B having the firestop device 10 extends through an opening 104A in the partition 104. The hub portion 50B can be positioned at any angle regardless of the plane of the partition. The body 50A of the plumbing fitting 50 is on one (1) side of the partition 104 with the hub portion 50B having the firestop device 10 extending through the opening 104A in the partition 104 such that the second end 12B of the firestop device 10 extends through the opening 104A to the other side of the partition 104. Thus, the section of the housing 12 having the intumescent material 16 is not in the opening 104A but extends beyond the opening 104A. The first end 12A of the housing 12 of the firestop device 10 may be located on the side of the partition 104 adjacent the body 50A of the plumbing fitting 50 or the housing 12 can be located only on the side of the partition 104 opposite the body of the plumbing fitting 50 and in the opening 104A. To attach the firestop assembly to the plumbing system 100, the conduit 102 is inserted into the second end 12B of the housing 12 into the inner passageway 12C of the housing 12 and through the inner passageway 14C of the connector 14 and is secured in the inner passageway 50C of the hub portion 50B. The second portion 14E of the connector 14 assists in centering the conduit 102 in the hub portion 50B of the plumbing fitting 50 and allows for easier connection of the conduit 102 to the plumbing fitting 50. The conduit 102 may also be secured to the second portion 14E of the connector 14. The conduit 102 could be secured to the connector 14 by any well known means such as adhesive welding.

In use, when the firestop device 10 is exposed to heat and the housing 12 reaches a predetermined temperature, the housing 12 remains undeformed and conducts the heat to the intumescent material 16. The housing 12 also protects the hub portion 50B and the adjacent body 50A of the plumbing fitting 50. When the intumescent material 16 reaches a predetermined temperature, the intumescent material 16 expands. In one (1) embodiment, the intumescent material 16 begins to expand, when it reaches a temperature of 250°. The undeformed housing 12 forces the intumescent material 16 to expand inward thus, exerting pressure on the conduit 102. The end flange 12D of the housing 12 also prevents the intumescent material 16 from expanding outward along the longitudinal axis of the housing 12. Usually, the conduit 102 is constructed of a material which deforms or weakens with heat such as PVC. As the intumescent material 16 expands and exerts pressure on the conduit 102, the weakened conduit 102 is crushed and collapses. This allows the intumescent material 16 to completely fill the inner passageway 12C of the housing 12 and to completely block the entrance of the hub portion 50B such that smoke and fire can not move through the plumbing system 100 or the partition 104 by moving through the plumbing fitting 50.

It is intended that the foregoing description be only illustrative of the present invention and that the present invention be limited only by the hereinafter appended claims.

I claim:

1. A firestop device for mounting on a hub portion of a plumbing fitting of a plumbing system installed in a structure to prevent the transmission of smoke and fire through the plumbing fitting, which comprises:
    (a) a housing constructed of a heat resistant material having a first end and a second end with an inner passageway extending between the ends wherein a shape and size of the inner passageway at the first end is configured to extend over the hub portion of the plumbing fitting;
    (b) intumescent material held in the inner passageway of the housing at the second end wherein an inner diameter of the housing with the intumescent material at the second end of the housing is configured such as to prevent the inner passageway having the intumescent material from extending over the hub portion of the plumbing fitting wherein the intumescent material when heated is configured to crush a conduit of the plumbing system which extends through the firestop device and to completely fill the inner passageway of the housing at the second end; and
    (c) a connector positioned in the inner passageway of the housing spaced between the intumescent material and the first end of the housing.

2. The device of claim 1 wherein the connector has a first end and a second end with an inner passageway extending therebetween, the inner passageway of the connector having a first portion with a first diameter adjacent the first end and a second portion with a second diameter adjacent the second end and wherein the first diameter is of a size to allow the first end of the connector to extend over the hub portion of the plumbing fitting.

3. The device of claim 2 wherein the second diameter of the second portion is of a size as to prevent the second portion from extending over the hub portion of the plumbing fitting.

4. The device of claim 1 wherein the connector has a first end and the second end with an inner passageway extending therebetween and wherein the firestop device is mounted on the hub portion so that a longitudinal axis of the connector is aligned with a longitudinal axis of the hub portion.

5. The firestop device of claim 1 wherein the diameter of the inner passageway with the intumescent material at the second end of the housing is configured to be essentially equal to an inner diameter of the hub portion of the plumbing fitting.

6. The device of claim 1 wherein a fastener is inserted through the housing and is configured to extend into the hub portion of the plumbing fitting to securely mount the device on the plumbing fitting.

7. The device of claim 1 wherein the housing is constructed of metal.

8. The device of claim 1 wherein a thickness of the intumescent material is such that when the intumescent material is heated to a preset temperature, the intumescent material expands to completely fill the inner passageway at the second end of the housing.

9. A firestop device for mounting on a hub portion of a plumbing fitting to prevent transmission of smoke and fire through the plumbing fitting, which comprises:
    (a) a housing having a first end and a second end with an inner passageway having a cylindrical shape extending between the ends wherein a diameter of the inner passageway at the first end is configured to extend over the hub portion of the plumbing fitting;
    (b) intumescent material held in the inner passageway of the housing adjacent the second end; and (c) a connector having a first end and a second end with an inner passageway extending between the ends and positioned in the inner passageway of the housing spaced between the intumescent material and the first end of the housing wherein an inner diameter of the inner passageway of the connector at the first end of the connector is configured to allow the first end of the connector to extend over the hub portion of the plumbing fitting.

10. The device of claim 9 wherein a diameter of the inner passageway of the connector at the second end is less than the diameter of the inner passageway of the connector at the first end to prevent the second end of the connector from extending over the hub portion.

11. The device of claim 9 wherein the intumescent material is spaced apart from the hub portion.

12. The device of claim 9 wherein a fastener is inserted through the housing and the connector and is configured to extend into the hub portion of the plumbing fitting to securely mount the device on the plumbing fitting.

13. The device of claim 9 wherein the housing is constructed of metal.

14. The device of claim 9 wherein a thickness of the intumescent material is such that when the intumescent material is heated to a preset temperature, the intumescent material expands to completely fill the inner passageway at the second end of the housing.

15. A firestop coupling assembly for preventing the transmission of smoke and fire through a partition in a structure, including a plumbing fitting having a hub portion, the improvement which comprises:
   a firestop device secured on the hub portion of the plumbing fitting, the firestop device including:
      a housing constructed of a heat resistant material with a first end and a second end with an inner passageway having a cylindrical shape extending between the ends, a diameter of the inner passageway at the first end configured to allow the first end of the housing to extend over the hub portion;
      intumescent material positioned in the inner passageway at the second end; and
      a connector having a first end and a second end and with an inner passageway extending between the ends and positioned in the inner passageway of the housing spaced between the intumescent material and the first end of the housing wherein an inner diameter of the inner passageway of the connector at the first end of the connector is configured to allow the first end of the connector to extend over the hub portion of the plumbing fitting.

16. The assembly of claim 15 wherein a diameter of the inner passageway of the connector at the second end is less than the diameter of the inner passageway of the connector at the first end to prevent the second end of the connector from extending over the hub portion.

17. The assembly of claim 15 wherein the hub portion with the firestop device is configured to extend through an opening in the partition of the structure.

18. The assembly of claim 15 wherein a fastener is inserted through the housing and the connector and extends into the hub portion of the plumbing fitting to securely mount the firestop device on the plumbing fitting.

19. The assembly of claim 15 wherein the housing is constructed of metal.

20. The assembly of claim 15 wherein a thickness of the intumescent material is such that when the intumescent material is heated to a preset temperature, the intumescent material expands to completely fill the inner passageway at the second end of the housing.

21. A method for preventing the transmission of smoke and fire through a plumbing system in a structure, comprising the steps of:
   (a) providing a plumbing fitting having at least one hub portion;
   (b) providing a firestop device including a housing constructed of a heat resistant material having a first end and a second end with an inner passageway extending therebetween wherein the first end of the housing is configured to extend over the hub portion of the plumbing fitting; intumescent material positioned in the inner passageway at the second end; and a connector having a first end and a second end and with an inner passageway extending between the ends and positioned in the inner passageway of the housing spaced between the intumescent material and the first end of the housing wherein an inner diameter of the inner passageway of the connector at the first end of the connector is configured to allow the first end of the connector to extend over the hub portion of the plumbing fitting;
   (c) mounting the firestop device over the hub portion of the plumbing fitting;
   (d) installing the plumbing fitting in the plumbing system in the structure; and
   (e) heating the intumescent material to a first predetermined temperature such that the intumescent material expands to fill the inner passageway at the second end of the housing which prevents smoke and fire from entering the plumbing fitting through the hub portion having the firestop device and from being transmitted through the plumbing system in the structure.

22. The method of claim 21 wherein the plumbing fitting is for use through a partition of the structure and wherein in step (d), the plumbing fitting is installed such that the hub portion having the firestop device is inserted through an opening in the partition such that the second end of the housing of the firestop device having the intumescent material is on a side of the partition opposite a body of the plumbing fitting.

23. The method of claim 21 wherein in step (e), the housing is heated to a second predetermined temperature and wherein the housing conducts heat to the intumescent material to heat the intumescent material to the first predetermined temperature.

24. A plumbing system for preventing transmission of smoke and fire through a partition in a structure, the system including a plumbing fitting having a hub portion and a conduit for mounting in the plumbing fitting, the improvement which comprises:
   a firestop device secured on the hub portion of the plumbing fitting, the firestop device including:
      a housing constructed of a heat resistant material with a first end and a second end with an inner passageway wherein a diameter of the inner passageway at the first end is such as to extend over the hub portion; and
      intumescent material held in the inner passageway at the second end of the housing and a connector having a first end and a second end and with an inner passageway extending between the ends and positioned in the inner passageway of the housing spaced between the intumescent material and the first end of the housing wherein an inner diameter of the inner passageway of the connector at the first end of the connector is configured to allow the first end of the connector to extend over the hub portion of the plumbing fitting.

25. The system of claim 24 wherein the conduit is inserted into the second end of the housing of the firestop device and into the hub portion and is secured in the hub portion.

26. The system of claim 25 wherein an inner diameter of the intumescent material is slightly greater than an outer diameter of the conduit.

27. The system of claim 24 wherein a diameter of the inner passageway of the connector at the second end is less than the diameter of the inner passageway of the connector at the first end to prevent the second end of the connector from extending over the hub portion.

28. The system of claim 24 wherein the plumbing fitting has two or more hub portions, wherein there are two or more firestop devices and wherein at least two of the hub portions have firestop devices.

* * * * *